United States Patent
Surbayrole et al.

(10) Patent No.: US 11,310,627 B2
(45) Date of Patent: Apr. 19, 2022

(54) METHOD FOR GEOLOCATION OF CONNECTED OBJECTS, CONNECTED OBJECT, ASSOCIATED TERMINAL AND SYSTEM

(71) Applicant: ORANGE, Issy-les-Moulineaux (FR)

(72) Inventors: Philippe Surbayrole, Chatillon (FR); Apostolos Kountouris, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 16/759,173

(22) PCT Filed: Oct. 23, 2018

(86) PCT No.: PCT/FR2018/052633
§ 371 (c)(1),
(2) Date: Apr. 24, 2020

(87) PCT Pub. No.: WO2019/081847
PCT Pub. Date: May 2, 2019

(65) Prior Publication Data
US 2021/0136520 A1   May 6, 2021

(30) Foreign Application Priority Data

Oct. 25, 2017 (FR) .................................... 1760066

(51) Int. Cl.
*H04W 4/02* (2018.01)
*H04W 4/029* (2018.01)
*H04W 4/06* (2009.01)

(52) U.S. Cl.
CPC .......... *H04W 4/023* (2013.01); *H04W 4/029* (2018.02); *H04W 4/06* (2013.01)

(58) Field of Classification Search
None
See application file for complete search history.

(56) References Cited

U.S. PATENT DOCUMENTS

2007/0184852 A1 * 8/2007 Johnson ................ H04W 64/00
455/456.1
2012/0220309 A1   8/2012 Yeh et al.
(Continued)

FOREIGN PATENT DOCUMENTS

EP   2045613 A   4/2009

OTHER PUBLICATIONS

English translation of International Search Report and Written Opinion dated Apr. 28, 2020 for corresponding International Application No. PCT/FR2018/052633, dated Oct. 23, 2018.
(Continued)

*Primary Examiner* — Adolf Dsouza
(74) *Attorney, Agent, or Firm* — David D. Brush; Westman, Champlin & Koehler, P.A.

(57) ABSTRACT

A connected object, which is able to calculate its own position without using embedded elements specific for doing this. The connected object possesses a wireless receiver for receiving signals coming from a plurality of located terminals. The signals include location data for locating the located terminals. The connected object calculates a piece of geolocation information of its own position based on a plurality of location data coming from the various located terminals.

9 Claims, 3 Drawing Sheets

(56) References Cited

U.S. PATENT DOCUMENTS

Figure 1:
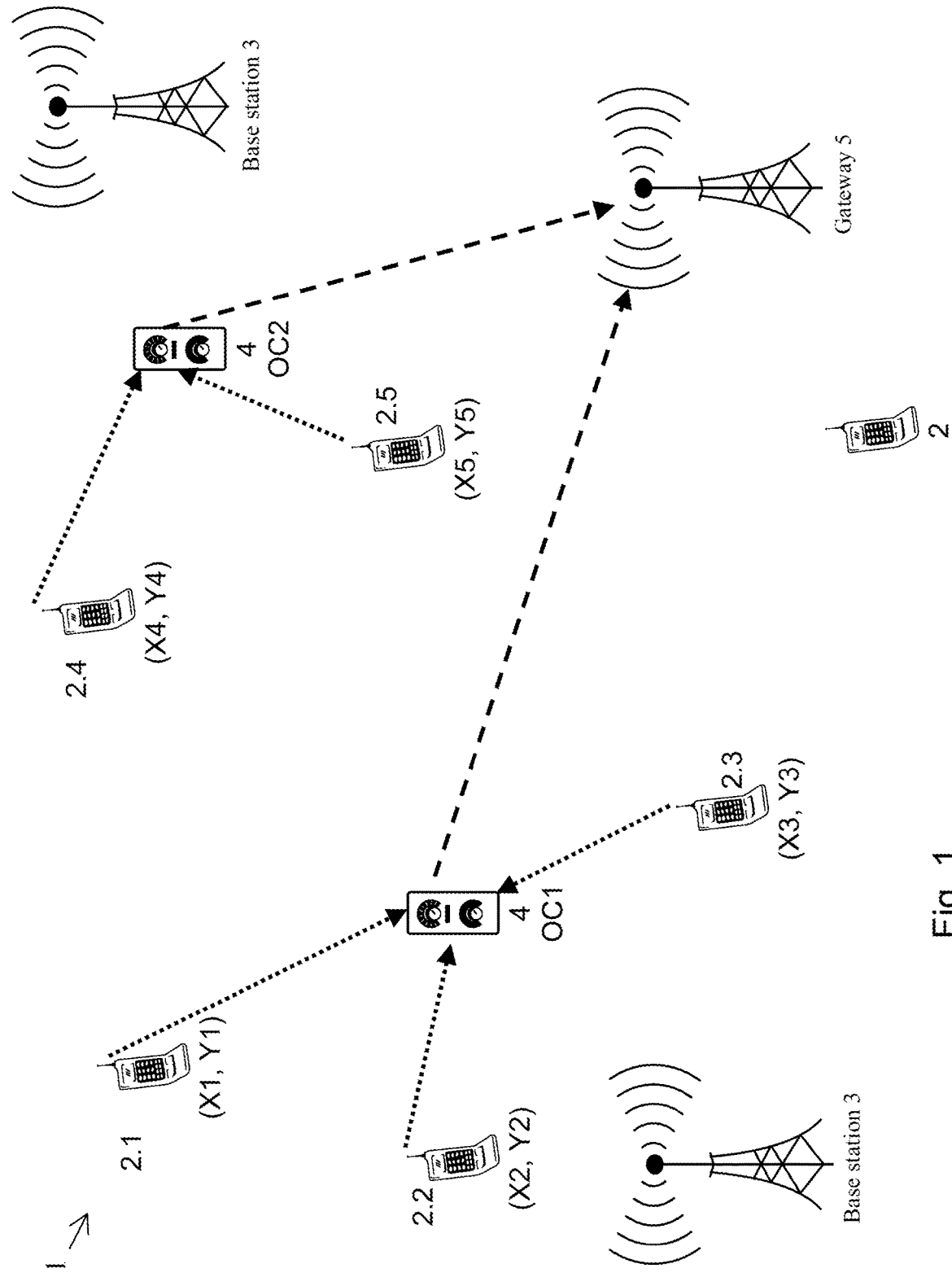

| | | | | |
|---|---|---|---|---|
| 2015/0133173 A1* | 5/2015 | Edge | ......................... | G01S 1/66 455/456.6 |
| 2016/0127875 A1* | 5/2016 | Zampini, II | .............. | G01S 5/00 370/311 |
| 2017/0146635 A1* | 5/2017 | Basha | ..................... | G01S 11/06 |

OTHER PUBLICATIONS

International Search Report and Written Opinion dated Jan. 15, 2019 for corresponding International Application No. PCT/FR2018/052633, filed Oct. 23, 2018.

* cited by examiner

METHOD FOR GEOLOCATION OF CONNECTED OBJECTS, CONNECTED OBJECT, ASSOCIATED TERMINAL AND SYSTEM

1. CROSS-REFERENCE TO RELATED APPLICATIONS

This application is a Section 371 National Stage Application of International Application No. PCT/FR2018/052633, filed Oct. 23, 2018, the content of which is incorporated herein by reference in its entirety, and published as WO 2019/081847 on May 2, 2019, not in English.

2. FIELD OF THE INVENTION

The invention relates to the field of connected objects furnished with a wireless reception means for communicating with terminals which know their locations. The invention relates more particularly to the fact that the object receives from these terminals their location data and calculates a geolocation information item in respect of its own position.

3. PRIOR ART

Nowadays, the number of connected objects (also called "communicating objects") in the world is growing incessantly. Connected objects are wirelessly connected electronic devices, sharing information with a computer, a tablet or a smartphone . . . and capable of perceiving, analyzing and acting according to the contexts and their environment. These objects are often used in the technical context of the IoT (standing for "Internet of Things"). In this context, a plurality of connected objects are deployed over the terrain so as to fulfil application-related objectives. The applications are for example the tracking of the transport of food commodities, in this case the object comprises a thermometer and a memory. In this way the recipient can read the temperature data recorded in the object and thus verify that the cold chain has not been broken. The connected objects can take all sorts of aspects among which may be cited: a compact module, a watch, a heart beat detector, an electronic chip inserted into a garment, . . . .

Generally, connected objects possess a bidirectional radio communication means for dialoguing with a communication device. Such a means makes it possible to upload information and/or receive commands. The radio communication means can use range-dependent technologies. The NFC, Bluetooth and Zigbee protocols are favored for short-range, whilst WIFI or Z-Wave links are used for medium-range. For long-range, the object preferably communicates with the aid of a cellular network, GSM for example.

A fair number of applications require geolocation of the connected object, for at least several reasons: either because this forms part of the application installed in the object, for example a tracking application, or to optimize the operation of the objects, or else to optimize the management of the entire pool of objects.

To know the position of a connected object, the following solutions exist nowadays:
 The connected object incorporates a battery-operated location device (using for example the GPS system or another geolocation system).
 In the case where the object is not intended to move, it is possible during its installation to communicate its location data to it so that it stores them. Accordingly, the operator carries out a position logging with their location system (a smartphone, or a terminal having a GPS module) and transmits the location data to the connected object by radio. These data can subsequently be emitted by the object during communications with a remote terminal.
 In the case where the object communicates with a cellular network (the GSM system for example), the multiple receptions by this object of a signal transmitted by the fixed base stations/gateways/access points are used by this object to calculate the location data by triangulation calculation with the aid of the arrival time difference and/or power of the signal, and of the position of the stations.
 Geolocation solutions also exist which use directional antennas on receivers situated in the connected object in addition to conventional calculations. By steering the antenna, the object determines the directions of radio signals originating from located sources (such as fixed beacons) and deduces its own position therefrom.

These various solutions exhibit a certain number of drawbacks.

The use of a geolocation module of GPS type consumes an enormous amount of energy for these objects whose power supply is quite often reduced to a cell-type battery of very low capacity. Moreover, the incorporation of a geolocation module occupies a non-negligible space, this not always being possible having regard to the volume available in the connected object. Moreover, if the geolocation module is not static and/or the installation does not make it possible to log the position (interior installation or the like), it is not always easy/possible to log the position during installation. The use of the receivers to perform triangulation calculations is very expensive in terms of hardware (specific receivers with very precise synchronization of the clocks) and requires a communication network furnished with fixed beacons for a not very precise result. Moreover, to locate an object precisely, it is necessary to receive radio signals emanating from a minimum of three receivers which are situated sufficiently far apart.

In summary the current state of the art is confronted with three problems:
 The energy-related and financial cost of integrating a location system into a communicating module.
 The location constraints during installation (impossibility of logging the position and error during uploading of position in the information system).
 The high cost of installation of an infrastructure support (receivers synchronized over the terrain and solver at the level of the SI) to triangulate the modules communicating.

In this context, it is necessary to find an innovative solution which makes it possible at one and the same time not to consume too much energy, not to add equipment in the object on account of its reduced volume and so as not to increase costs. Finally this solution must also make it possible to locate an object which is on the move.

4. SUMMARY OF THE INVENTION

The invention relates in particular to a connected object furnished with a wireless reception means for receiving signals originating from a plurality of located terminals, said signals comprising location data for locating said located terminals. The connected object comprises a calculation means able to determine a geolocation information item in respect of its position on the basis of a plurality of data originating from different located terminals. The calculation means determines a precision datum associated with the calculated geolocation information item, the value of this precision datum takes into account a number of occurrences of location data used for the calculation of the geolocation information item. The connected object comprises a means for emitting the precision datum and the location information item, outside of the terminal.

In this way, by using devices communicating with one another and the location data at their disposal, it is possible for the connected objects which do not have their own geolocation means to calculate an information item regarding their location. This solution relies on the fact that equipments situated in proximity to the connected object have at their disposal an information item regarding their location and can broadcast it in their neighborhood. This broadcasting is performed according to a transmission protocol which is compatible with the means of wireless reception of the connected objects. The signals emitted by the located terminals might not be intended for the connected object, but by receiving them in an opportunistic manner, the latter avails itself thereof in order to calculate its position.

Moreover, this solution makes it possible at one and the same time not to consume too much energy, not to add equipment in the object on account of its reduced volume and not to increase costs. This solution also makes it possible to locate an object which is on the move.

The calculation means determines a precision datum associated with the calculated geolocation information item, the value of this precision datum takes into account a number of occurrences of location data used for the calculation of the geolocation information item. In this way, the calculated geolocation information item is associated with a precision datum which is calculated in particular on the basis of the number of occurrences of location data received by the connected object. It is possible to inform a recipient of the datum locating the object, of the precision of this datum.

According to one embodiment, the object furthermore comprises a first control means for periodically activating and deactivating the reception and calculation means, the frequency of activation of the reception and calculation means evolving in a manner inversely proportional to the value of the precision datum. By periodically deactivating and activating the reception and calculation means, the consumption of the object is reduced. Moreover, the activation frequency can decrease if the precision of the calculation of the geolocation information item increases or is greater than a predetermined value. In this way, it is possible to wake the object less often and therefore to save its battery, when the precision in the position is good.

According to another embodiment, said signals furthermore comprise a datum representative of the power of the signal emitted by located terminals, the calculation means determining the distance between the object and these terminals as a function of the received power datum and of the amplitude of the signal measured on reception, the calculation means determining the object's geolocation information item by using the distances with the located terminals. In this way, the object measures the power of the received signal and, knowing the emission power, it can then calculate the theoretical distance which separates it from this terminal, this distance being taken into account for the calculation of the geolocation information item.

According to another embodiment, the precision datum determined by the calculation means depends on the number of occurrences of location data having served to determine distances between the object and the terminals and which have been used for the calculation of the object's geolocation information item. In this way, the calculation of the precision datum also takes into account the determination of the distance, the geolocation being more precise when the distance with the terminals is calculated.

According to another embodiment, the object comprises a second control means for activating and deactivating the calculation means, and in that the location data are transmitted by the located terminals in a packet comprising an identifier in its header, the second control means activating the calculation means during the reception of the identifier so as to process the location data contained in the body of the packet. In this way, with the aid of the preamble announcing the emission of location data emitted by a terminal, it is possible to wake the object's control unit sufficiently early so that the processing of the datum is performed just after it is broadcast.

According to another embodiment, the object comprises an emission means for emitting the geolocation information item determined by the calculation means. In this way, the connected object transmits in its turn its position and becomes in fact a located terminal, in relation to another connected object which needs to self-locate.

According to another embodiment, the object has a memory for storing a succession of geolocation information items determined by the calculation means, said calculation means determines that the object is in motion when at least two consecutive geolocation information items are mutually offset geographically by at least a predefined distance. In this way, it is possible to determine easily whether the object is mobile or whether it is fixed, and to inform a remote server thereof.

According to another embodiment, the object comprises a control means for periodically activating and deactivating the means for receiving location data and for calculating the geolocation information item, and a motion detection module configured to increase the frequency of activation of the reception and calculation means during detection of a motion of the object. In this way, it is possible to maintain a good precision of the object by activating the control unit more often and therefore, by effecting acquisition of these data more often.

According to another aspect, the invention relates to a method for geolocating an object furnished with a wireless reception means comprising the following steps:
  reception by the object of signals originating from a plurality of located terminals, said signals comprising location data for locating said located terminals,
  calculation within the object of a geolocation information item in respect of the position of the object by using as input data at least one plurality of location data originating from different located terminals,
  calculation of a precision datum associated with the geolocation information item by taking into account a number of occurrences of location data used for the calculation of the geolocation information item,
  emission outside of the connected object of the geolocation information item and of the precision datum.

According to another aspect, the invention also relates to a geolocation system comprising a plurality of located terminals and at least one connected object furnished with a wireless reception means for receiving wireless signals originating from said located terminals, said signals comprising location data for locating said located terminals, the object comprising a calculation means processing a plurality of location data originating from different located terminals and providing on the basis of these data a geolocation information item in respect of the position of the object and a precision datum which is calculated by taking at least into account a number of occurrences of location data used for the calculation of the geolocation information item.

According to another aspect, the invention also relates to a terminal comprising a means for obtaining location data representing the geographical position of said terminal and a means of wireless broadcasting of said location data.

According to a particular embodiment, the broadcasting means is configured to broadcast at least one burst of consecutive messages emitted at different powers, and respectively containing said location data.

According to another aspect, the invention relates to a broadcasting method implemented by a terminal, characterized in that it comprises a step of obtaining location data representing the geographical position of said terminal and a step of wireless broadcasting of at least one burst of consecutive messages emitted at different powers, said messages containing said location data.

The invention also relates to a computer program product comprising program code instructions for the execution of one of the methods described above.

5. LIST OF FIGURES

Figure 3:
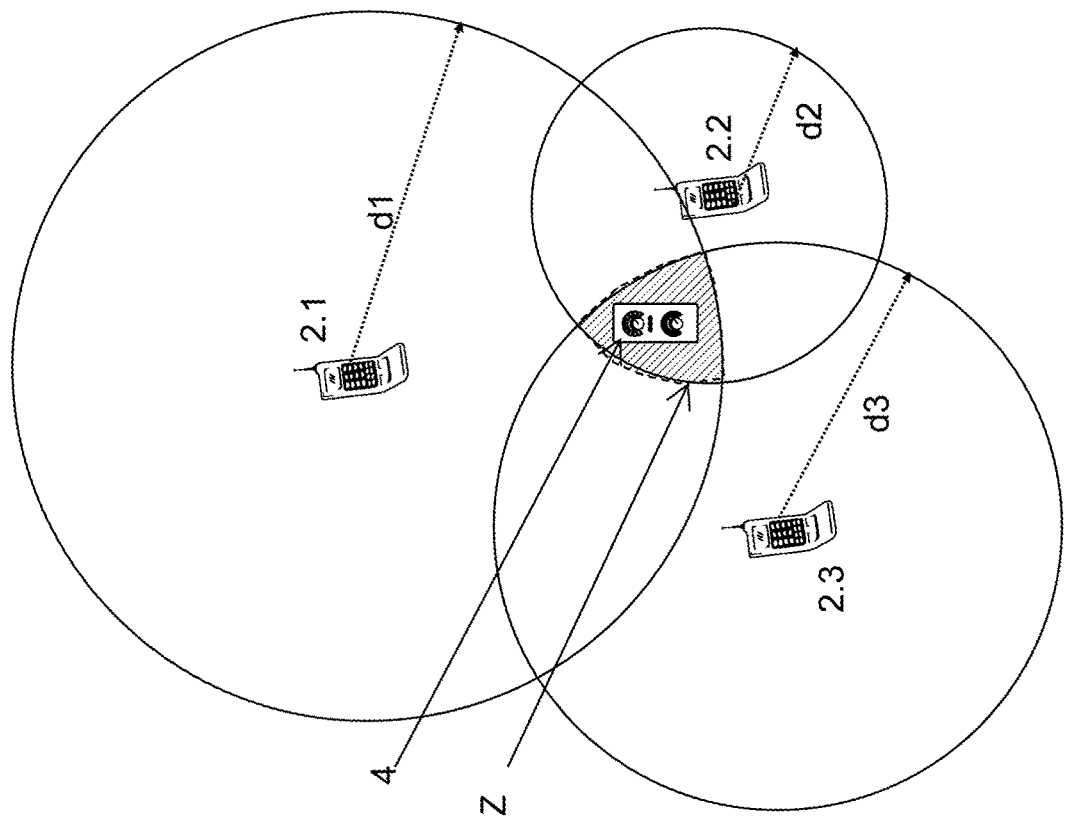
Figure 2:
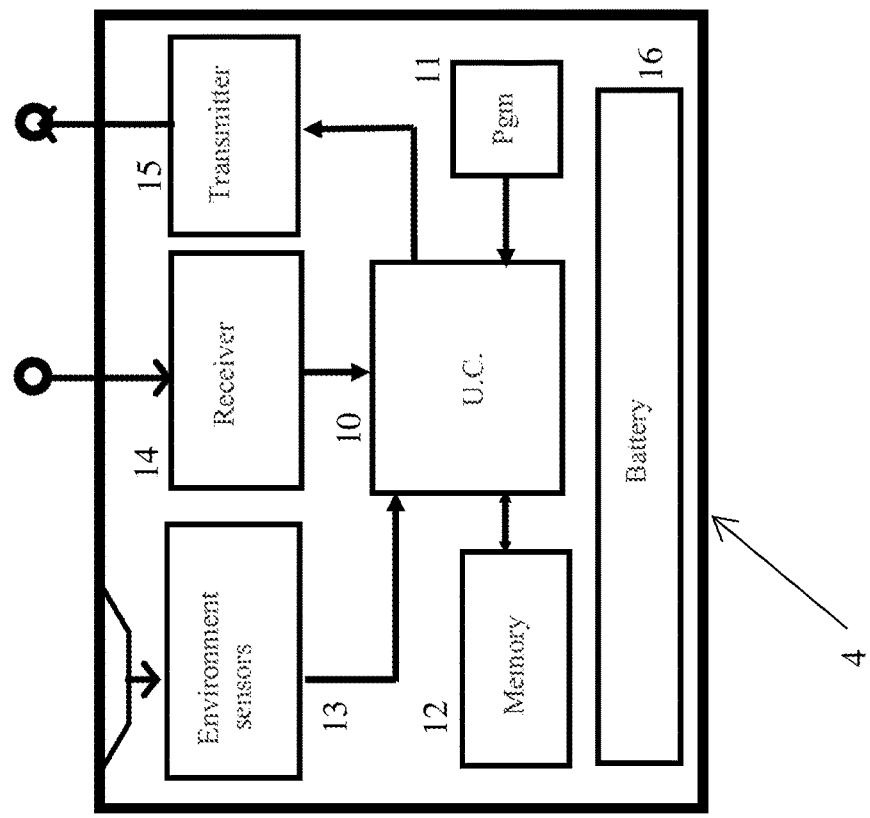
Figure 4:
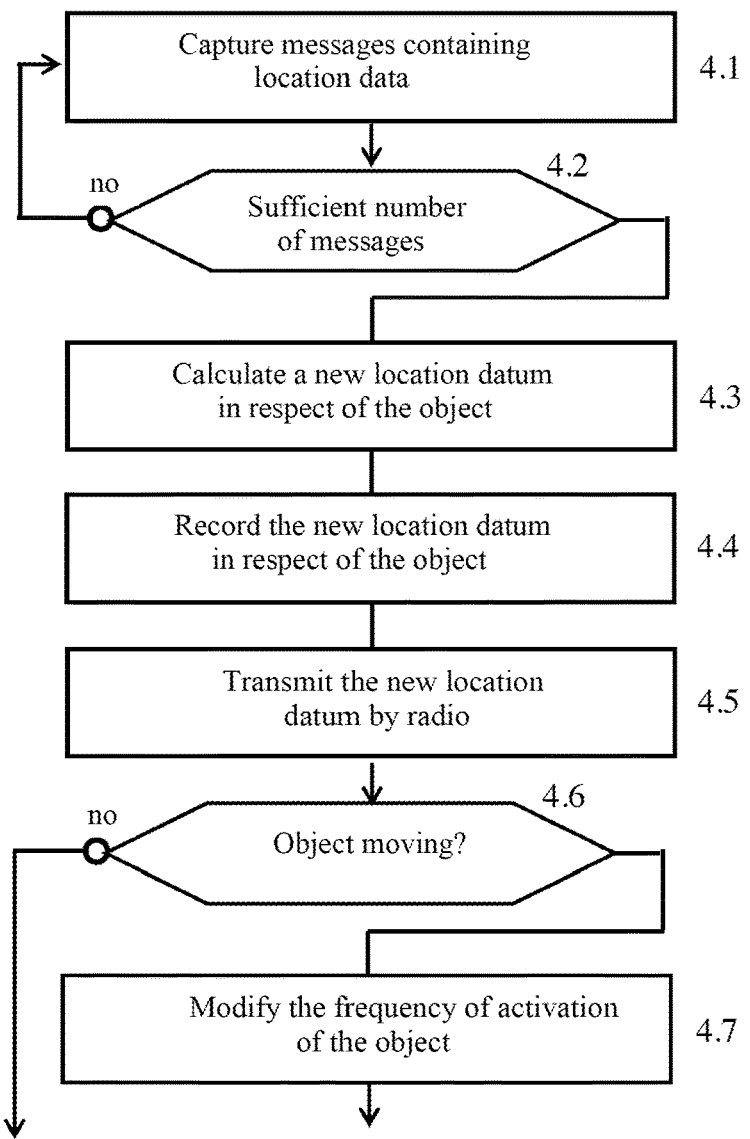
Figure 5:
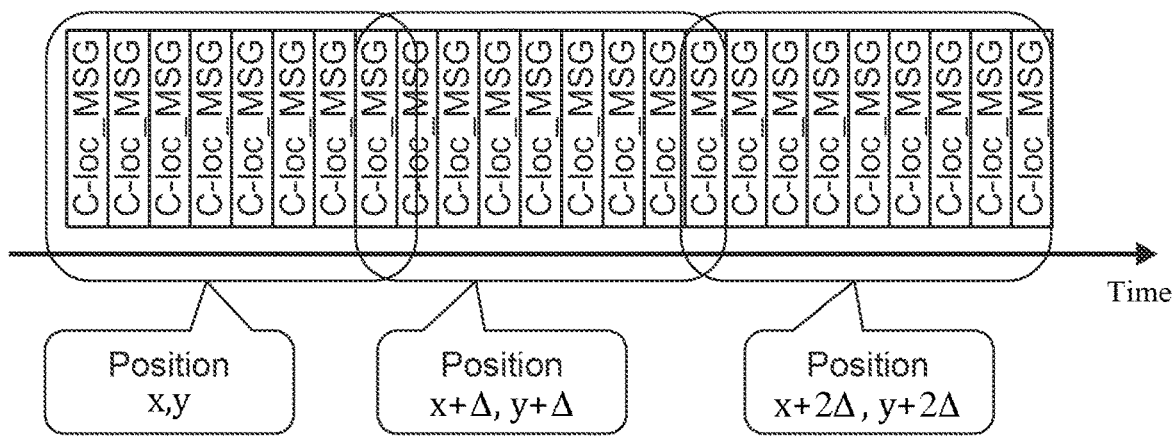

Other characteristics and advantages of the invention will become more clearly apparent on reading the following description of a particular embodiment given by way of simple illustrative and non-limiting example, and the appended drawings, among which:

FIG. 1 shows a communication system comprising connected objects and located terminals according to an exemplary embodiment, FIG. 2 presents the main elements of a connected object according to an exemplary embodiment, FIG. 3 presents a first variant for geolocating a connected object by using the emission power of the messages, FIG. 4 presents an exemplary flowchart of the main steps of a method for locating a connected object, FIG. 5 represents a table of the results of calculations performed so as to determine whether the object is in motion.

6. DESCRIPTION OF AN EMBODIMENT OF THE INVENTION

6.1 General Principle

The present invention allows a connected object to calculate its position itself. Accordingly, the connected object has at its disposal a wireless reception means for receiving signals originating from a plurality of located terminals, these signals comprising location data for locating said located terminals. The object furthermore comprises a calculation means able to determine a geolocation information item in respect of its position on the basis of a plurality of data originating from different located terminals.

6.2 Description of an Embodiment

FIG. 1 shows a communication system comprising connected objects and located terminals according to an exemplary embodiment. This system comprises a communication network 1 in which terminals 2, 2.1, 2.2, 2.3, 2.4, 2.5 dialogue with one another through a wireless link, by voice, by light, or by radio (Wifi for example, or any radioelectric signals). These terminals are for example mobile telephones, smartphones, digital tablets, computers, . . . or any other terminal communicating remotely for example by radio. The terminals 2 have at their disposal a geolocation means or already know their location data, and this is the reason why, hereinafter in the document, they are called "located terminals". This geolocation means can be embedded on board the terminal, as is the case for a GPS module (standing for "Global Positioning System). According to a variant, the terminal's location data C-loc can also be formulated by the terminal in conjunction with the communication network, as is the case for cellular telephones (by a triangulation calculation involving the transmission times of the signals). In the latter case, the telephone 2 communicates with several fixed bases 3 and exchanges specific messages for the positioning calculation. The bases 3 emit messages comprising their own location data, and a temporal reference for time-stamping the emission of the messages. The messages are broadcast around the base and received by the telephone 2 with a delay dependent on the distance separating the two devices. With the aid of the location data for at least three fixed bases 3 and by calculating the distances between these bases and a terminal 2, the latter calculates its own position by triangulation. The located terminals 2 then emit their location data C-loc in a message via the communication network 1. The location data are preferably emitted by the located terminals to their neighborhood by using specific radio emissions, by Bluetooth broadcasting for example. This radio emission can also be picked up by apparatuses of another type, connected objects for example, and which are not intended to communicate with this network. The location data C-loc can be transmitted between two terminals during an application session.

The present invention relates to the fact that the messages emitted by located terminals and containing their location data C-loc, are picked up by connected objects 4 (also called "communicating objects"). Once the calculation of the location information item, called "INF_Loc" hereinafter, has been performed, the connected object 4 can transmit it by broadcasting, for example to a communication gateway 5 where it will be dispatched to the server of the application using the objects.

According to a first variant embodiment, the messages are emitted by short-range radio means (NFC, Bluetooth or Zigbee protocols for example) of the terminals 2, 2.1, 2.2, . . . . If the connected object 4 is capable of picking up a message emitted by a terminal, then it is necessarily situated in proximity, that is to say at a distance of less than a predefined distance DIST_min, from this terminal. This distance DIST_min depends on the type of transmitted signals. In the case of Bluetooth, it is of the order of a few meters, in the case of Wifi, it is of some fifty or so meters, and in the case of a GSM network, it is of the order of several kilometers.

FIG. 2 illustrates the main components of a connected object 4 according to a preferred embodiment. The connected object 4 comprises in particular the following elements:

- a Control Unit 10 (UC), typically a microprocessor and its associated program memory 11,
- a nonvolatile data memory 12, for example Flash or EEPROM memory,
- a so-called "opportunistic" means for receiving radio signals 14 intended to pick up the messages transmitted by the located terminals. This means is preferably embodied by the control unit 10 and a software module. The mode of reception can be simply unidirectional, and this means can receive signals according to different protocols. In this way, the connected object self-geolocates, that is to say determines a geolocation information item INF_loc, by picking up messages originating from terminals. These terminals can either be of the same type or of different type (using the GSM network and a Wifi network for example).

an emission means 15 intended to transmit at least the measurements of the environment sensors 13. This link can be short-range or long-range radio, or else be based on induction or electrical contacts . . . . It can be simply unidirectional. No limitation is afforded to the type of this link, a battery 16, at least one environment sensor 13 (optional) whose type depends on the application using the object, it is possible to cite for example a thermometer, a pressure sensor, a moisture sensor, an anemometer, . . . , the measurements performed by these sensors are processed by the U.C. 10 and stored in memory 12 so as to be transmitted subsequently.

According to a variant embodiment, the means of emission 15 and the means of reception of radio signals 14 form one and the same means of emission and of reception of radio signals.

According to a preferred embodiment, the connected object can be placed in various modes of operation defined in the following manner:

ACTIVE: all the electronic elements are powered,

INACTIVE: the electronic elements are not powered, only a user interface makes it possible to wake the control unit 10, STANDBY: the reception means 14 is at least active for receiving messages, and other components are no longer powered. In this mode, the connected object consumes the least possible energy, while having minimum activity.

The connected object adopts one of these modes as a function of the moment in the course of which location data are determined.

FIG. 3 illustrates the principle of the calculation of a location information item INF_Loc by showing circular zones centered around three located terminals 2.1, 2.2 and 2.3, and by considering that beyond these three zones, the messages are no longer picked up. A connected object 4 situated in a zone common to the three zones receives messages containing respectively the coordinates of three located terminals 2.1, 2.2 and 2.3 and possibly accompanied by their emission powers. The coordinates represent location data C-loc within the meaning of the invention. The connected object 4 then determines the maximum distances d1, d2 and d3 around the location data beyond which the messages emitted by the terminals are no longer received. FIG. 3 represents these circular zones by circles around each terminal. The connected object then determines the coordinates of the point where the object is situated by considering that each zone is circular, their intersections being represented by the shaded zone Z. The connected object 4 calculates the location data of the point in the middle of this zone Z, this point being considered to be that where the connected object 4 is situated. The geolocation data for this point represent a geolocation information item INF_loc within the meaning of the invention. The more the calculation of the zone Z takes into account messages originating from different terminals, the more delimited the zone Z will be and the greater the precision of the calculation of the position of the object will be.

Advantageously, the distance DIST_min between this middle and the edges of the site at the intersection of the three circular zones defines the precision of the calculation. Indeed, the object can be situated at any point of the zone Z and not necessarily at its center. Other ways of calculating the precision PRE of the location of a connected object and the manner in which this datum is utilized will be seen further on in this document.

In a variant of this embodiment, the messages containing the location data do not contain any associated power value and the location information item is calculated solely on the basis of the location data, for example by calculating an average of these data.

According to an enhancement, the terminal 2 periodically broadcasts a message containing its location data C-loc, with a periodicity which is proportional to its speed of displacement. A terminal which does not move emits its position according to a long period, since when a device has received it once, these data change very little subsequently. If on the contrary the located terminal moves, its position at a given instant rapidly becomes obsolete, and its position, that is to say its location data, must be broadcast more often. In this way, the connected object can repeat the location calculation using more recent data. The connected object 4 thus determines a new geolocation information item INF_loc.

According to another variant embodiment, the connected object is furnished with a means making it possible to measure the power of the radio signal received from the located terminals. In the message containing their location data C-loc, the located terminals insert thereinto a datum representative of the power of the radio signal that they emit. In this way, the connected object 4 can measure the power of the received message and compare it with the emission power indicated in the message. The attenuation of the power then makes it possible to calculate the distance between the object and the located terminal which emitted this message. The object's geolocation information item INF_Loc is then determined by using the distances with the located terminals and the location data in respect of these terminals. Comparing it with the first variant, this second variant makes it possible to offer increased precision of the position of the object.

According to one embodiment, the terminal 2 broadcasts bursts of a determined number of messages with a power which increases or decreases from message to message, each message containing at least the location data C-loc and a value representative of its emission power. On reception, the object measures the powers of the various received messages and thus calculates the attenuation due to distance more precisely than if it received a single message. According to this enhancement, the precision of the object's geolocation datum increases more rapidly.

According to a simple embodiment, the connected object can avoid measuring the power of the received signal but confine itself solely to determining whether or not the message is received. For example, in the case where the terminal 2 emits a burst of 3 messages containing identical location data C-loc having an increasing power, the connected object 4 may receive only the last two messages but not the first. In a known manner, each signal emission is associated with a determined distance DIST_min1, DIST_min2 and DIST_min3 (DIST_min1<DIST_min2<DIST_min3). The connected object then determines that it is situated a distance of less than the distance DIST_min2 from the connected object 4.

FIG. 4 presents an exemplary flowchart of the main steps implementing a method for locating a connected object, according to the present invention.

A connected object 4 is placed in an environment comprising a plurality of located terminals, it is then switched on and executes its program recorded in the memory 11. In the course of a step 4.1, the object successively picks up messages originating from the terminals which contain at least one location datum. During each reception, the object determines whether the number of occurrences of the location data received since the last calculation is sufficient to perform a new calculation (step 4.2). The minimum number of messages for calculating the position of the object depends on the application. A single message may suffice. In the embodiment described, at least three messages emitted by different terminals are necessary to calculate the position of the object. When the fourth message is received, a new calculation is performed with the latter and the last two other messages.

If the test of step 4.2 is negative, the program loops back on itself and waits to receive other messages. In the converse case, in step 4.3, the object calculates a geolocation information item INF_loc and records it in memory 12. The calculation takes at least into account the location of the terminals, that is to say the location data C-loc contained in the received messages and optionally the power indicated in these messages and/or the power measured on receipt of these messages, these last two parameters making it possible to calculate a distance with the terminals considered. The connected object also evaluates whether or not a location datum received in one of the received messages is aberrant, this being in particular the case when a datum indicates a point situated too large a distance from the other received data.

Once the calculation has been performed, the object records it in its data memory 12 (step 4.4) and optionally emits it in a message destined for a gateway so that it is transmitted to an application server (step 4.5). According to another enhancement, the object comprises a radio emission means for emitting the geolocation information item INF_Loc determined by the calculation means, destined for other connected objects.

According to an enhancement, in step 4.6, the object analyzes the evolution of its geolocation information items INF-loc and measures the offsets between two calculations. If these offsets evolve by at least a determined distance in the course of a determined duration, this signifies that the object is moving at certain speed that it calculates and records in its data memory 12 (step 4.6).

According to a variant, a calculation is performed each time that a set of three messages is received. Another variant consists in that the object stores the received messages in a circular file and in that at regular time intervals, the control unit 10 utilizes the last three messages to extract therefrom the location data C-loc and calculate the location information item INF_loc.

FIG. 5 presents a table of the results of calculations performed to determine whether the object is in motion. This table comprises three groups of contents of messages emitted by located terminals, the first message group has made it possible to calculate a first position (x,y) of the object, the second message group has made it possible to calculate a second position (x+Δ,y+Δ) of the object, a third group . . . a third position (x+2Δ, y+2Δ), and so on and so forth. By taking the ratio between the distance traveled and the temporal offset separating the reception of two messages, the object can calculate its average speed in the course of the duration delimited by the reception of these two messages. If the calculated speed is greater than a predefined threshold value, then it may be considered that the object is in motion.

According to one embodiment, the object becomes periodically active after a duration in standby mode, activation being managed by an internal clock. During the first use, the object needs to rapidly calculate its first position, and the periodicity of the wakeups is short. When the connected object does not move and it is now only a matter of improving the precision of location, the object modifies its internal clock so as to increase the periodicity of the activations and to save the battery in order to render the connected object operational for longer.

During wakeup, the object switches to ACTIVE mode and the whole set of components becomes operational. From this moment, the reception means picks up all the radio messages emitted in the vicinity and when a message contains a location datum, the U.C. processes it with a view to calculating the position of the object. If the object detects that it is in motion, then it calculates its position more often so as to confer greater precision on it. In step 4.7 and subsequent to a position calculation and evaluation of the speed, the frequency of the activations of the object is updated and calculated so as to vary proportional to the speed of displacement of this object.

The object is characterized in motion when its speed exceeds a certain threshold. This threshold speed is registered in the memory 12 of the object and depends on the nature of the latter. If this object is intended to move (a bike for example) its threshold speed is of the order of 5 kilometer/hour, if on the other hand the object is not intended to move (a table for example), the threshold speed is a few meters per minute.

According to a variant embodiment, the location data C-loc emitted by the terminals are transmitted in a message or a data packet comprising a header (or a preamble) identifying the type of the data and a body containing said location data. In the standby mode, the reception means is active and receives all the radio messages picked up. The reception means constantly reads the data emitted by radio and compares them with a datum of the message preamble which identifies those containing the location data. When such a datum is detected, then the location datum will be received a short moment thereafter, the reception means activates the U.C. 10 with a view to the processing of the datum which will be received. The U.C. then records the datum and determines whether a sufficient number of location data have been received to determine the position of the object. If this is the case, the U.C. calculates the geolocation datum and optionally transmits it to the gateway 5.

An exemplary embodiment of the present application affords a solution which does not exhibit the drawbacks described above, while proposing the advantages listed herein.

An exemplary embodiment of the disclosure allows, in particular, connected objects, not having their own location means, to be able to calculate their location themselves without resorting to the diverse techniques of measurements on the signals emitted by the objects and measured by third-party equipment (e.g. of infrastructure comprising dedicated beacons).

Although the present disclosure has been described with reference to one or more examples, workers skilled in the art will recognize that changes may be made in form and detail without departing from the scope of the disclosure and/or the appended claims.

The invention claimed is:

1. A connected object which comprises:
a wireless receiver, which is configured to receive signals originating from a plurality of located terminals, said signals comprising location data for locating said located terminals;
a processor configured to:
calculate a geolocation information item in respect of a position of the connected object on the basis of a plurality of the location data originating from different ones of the plurality of located terminals,
determine a precision datum associated with the calculated geolocation information item, a value of this precision datum taking into account a number of occurrences of location data used for the calculation of the geolocation information item, and
periodically activate and deactivate the wireless receiver and the calculation of the geolocation item, wherein a frequency of activating the wireless receiver evolves in a manner inversely proportional to the value of the precision datum; and
an emitter, which is configured to emit the precision datum and the geolocation information item.

2. The connected object as claimed in claim 1, wherein each of said signals furthermore comprises a datum representative of power of the signal emitted by the respective located terminal, the processor determining a distance between the connected object and the respective located terminal as a function of the received power datum and of an amplitude of the signal measured on reception, the processor determining the connected object's geolocation information item by using the distances with the plurality of located terminals.

3. The connected object as claimed in claim 2, wherein the precision datum determined by the processor depends on the number of occurrences of location data having served to determine distances between the connected object and the located terminals and which have been used for the calculation of the object's geolocation information item.

4. The connected object as claimed in claim 1, wherein the location data are transmitted by the located terminals, each in a packet comprising an identifier present in a header, and the processor is configured to activate the calculating during reception of the identifier so as to process the location data contained in a body of the packet.

5. The connected object as claimed in claim 1, wherein the connected object has a memory for storing a succession of geolocation information items determined by the processor, and said processor is further configured to determine that the connected object is in motion when at least two consecutive geolocation information items are mutually offset geographically by at least a predefined distance.

6. The connected object as claimed in claim 5, wherein the connected object comprises a motion detector configured to increase a frequency of activation of the receiver and the calculation during detection of a motion of the connected object.

7. A method for geolocating a connected object furnished with a wireless receiver, wherein the method comprises:
receiving by the object signals originating from a plurality of located terminals, said signals comprising location data for locating said located terminals,
calculating within the object a geolocation information item in respect of a position of the object by using as input data at least one plurality of location data originating from different ones of the located terminals;
calculating within the object a precision datum associated with the geolocation information item by taking into account a number of occurrences of the location data used for the calculation of the geolocation information item;
the object periodically activating and deactivating the wireless receiver and the calculating of the geolocation item, wherein a frequency of activating the wireless receiver evolves in a manner inversely proportional to the value of the precision datum;
the object periodically activating and deactivating the wireless receiver and the calculation of the geolocation item, wherein a frequency of activating the wireless receiver evolves in a manner inversely proportional to the value of the precision datum; and
emitting by the connected object the geolocation information item and the precision datum.

8. A non-transitory computer-readable medium comprising a computer program product stored thereon comprising program code instructions for execution of a method of geolocating a connected object when said program is executed on a central unit of the connected object, wherein the program code instructions configure the connected object to:
receive, by a wireless receiver of the connected object, signals originating from a plurality of located terminals, said signals comprising location data for locating said located terminals,
calculate within the object a geolocation information item in respect of a position of the object by using as input data at least one plurality of location data originating from different ones of the located terminals;
calculate a precision datum associated with the geolocation information item by taking into account a number of occurrences of the location data used for the calculation of the geolocation information item;
periodically activate and deactivate the wireless receiver and the calculation of the geolocation item, wherein a frequency of activating the wireless receiver evolves in a manner inversely proportional to the value of the precision datum; and
emit by the connected object the geolocation information item and of the precision datum.

9. A geolocation system, comprising:
a plurality of located terminals; and
at least one connected object comprising:
a wireless receiver, which is configured to receive signals originating from the plurality of located terminals, said signals comprising location data for locating said located terminals; and
a processor configured to:
calculate a geolocation information item in respect of a position of the connected object on the basis of a plurality of the location data originating from different ones of the plurality of located terminals,
determine a precision datum associated with the calculated geolocation information item, a value of this precision datum taking into account a number of occurrences of location data used for the calculation of the geolocation information item, and
periodically activate and deactivate the wireless receiver and the calculation of the geolocation item, wherein a frequency of activating the wireless receiver evolves in a manner inversely proportional to the value of the precision datum; and an emitter, which is configured to emit the precision datum and the geolocation information item.

* * * * *